(No Model.)
E. L. CANTWELL.
MILK CAN, &c.
No. 489,554. Patented Jan. 10, 1893.
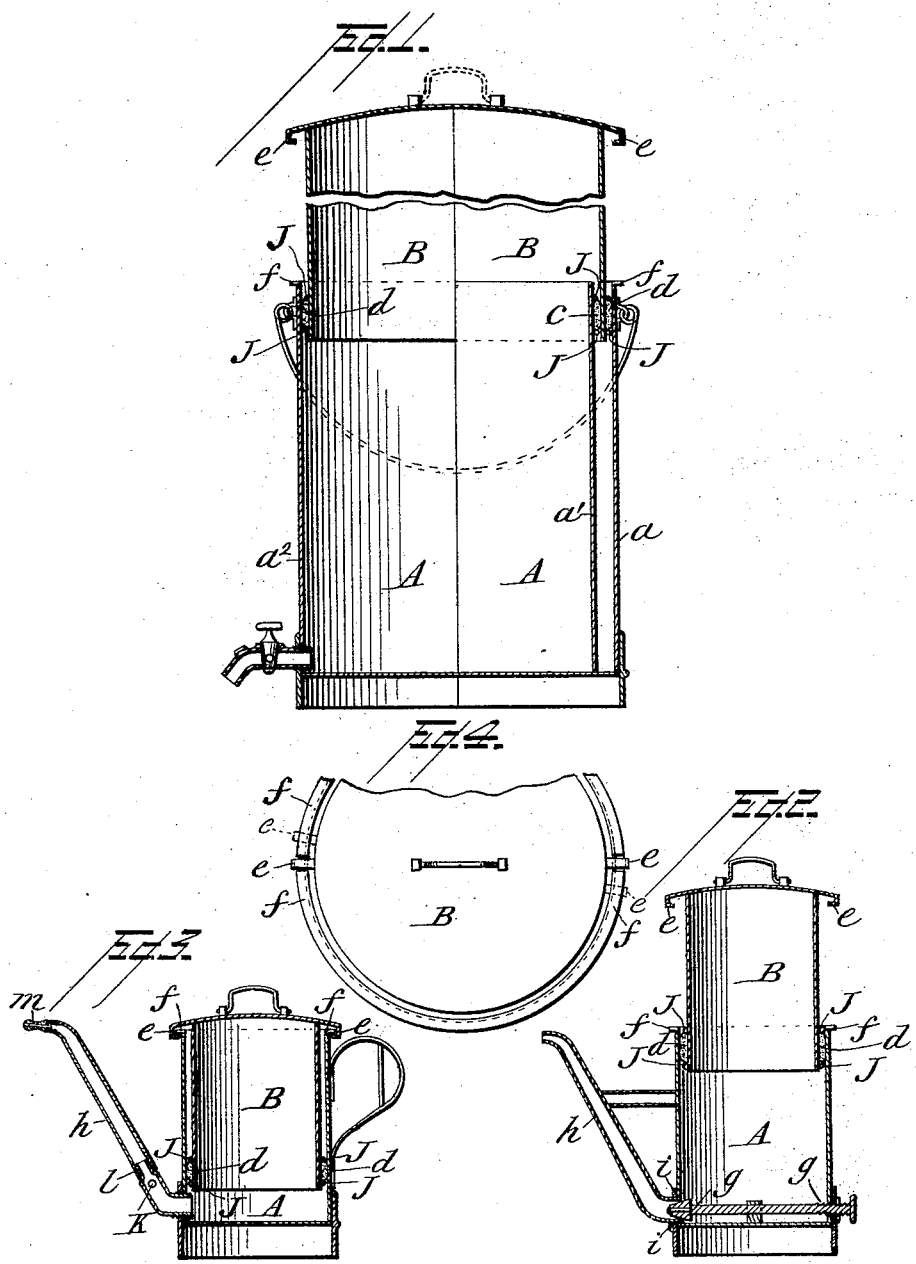
Attest:
F. H. Schott
M. C. Paul
Inventor
Edward L. Cantwell
by Wm. G. Henderson
Asso. Atty.

United States Patent Office.

EDWARD LENNON CANTWELL, OF CALCUTTA, INDIA.

MILK-CAN, &c.

SPECIFICATION forming part of Letters Patent No. 489,554, dated January 10, 1893.

Application filed March 25, 1892. Serial No. 426,465. (No model.)

*To all whom it may concern:*

Be it known that I, EDWARD LENNON CANTWELL, a British subject, residing at Calcutta, in British India, have invented a vessel for storing fluids under air-pressure, applicable to milk-cans, watering-cans, and other useful purposes, of which the following is a specification.

My invention has for its object the production of a vessel in which fluids can be stored under air pressure and which can be applied to various useful purposes such as preventing the milk in a can from churning while in transit as a watering can for orchids and other plants at a distance and—when made of glass—will be found useful in hospitals for administering certain medicines, and for other useful purposes.

The following is a description of the drawings annexed hereto and which are to be read as part of this specification.

In each figure the same letters refer to the same parts.

Figure 1—represents a vertical section of a milk can with the cover up. Fig. 2—a vertical section of a form of watering can with the cover up. Fig. 3—a vertical section of another form of watering can, showing the cover closed down and secured. Fig. 4 is a top plan view of the vessel, partly broken away, showing the slotted flange, to receive the inturned lip to the cover.

The air pressure is obtained in this vessel which may be made of any suitable material by making it in two parts, bottom A and top B; the upper part fitting into the lower part has a gasket packing of any suitable material bound round its lower rim to prevent the escape of the fluid at the side and when the top part acting as a hollow piston is pressed down the air caught inside is compressed and held over the fluid which will be ejected under considerable pressure on the tap being opened. The piston part after being pressed down is secured by clutches catching under top rim of bottom part of vessel.

In Fig. 1 two methods are shown for constructing the bottom part of the vessel, the sides $a$ and $a'$ on right side being double, between which the piston ring $d$ of top part is housed and slides up and down. The inner casing $a'$ has a ring of packing $c$ around its top rim in addition to a similar packing $d$ round bottom rim of top part. On the left, the side of the vessel $a^2$ Fig. 1 is shown as single, the same as in Figs. 2 and 3. The vessel having been filled with the fluid the top part B is pressed down until clutches $e, e$, pass through openings—parts cut-away—in rim $f, f$,—when the whole is turned to right or left until $e, e$, catches under rim $f, f$.

The top part B of the vessel is given a certain depth according to the air pressure desired. If the milk can be, say two feet high and the milk has to be merely removed from one point to another where it is discharged; and the can is filled to within an inch or so of the top; then the depth of B might be about one fourth that of A. But when a greater pressure is required, that is for ejecting water to a certain height, then B is made nearly the same depth as A as shown in Figs. 2 and 3.

In Fig. 2, a form of screw plug $g$ is shown for closing spout $h$ which has a flange $i$ for attachment to bottom of vessel. A raised bead rim J.J. attached all round to B houses in the gasket packing which may be of any suitable material such as rubber, hemp, or cotton. No nozzle or side handle is shown but they can be added if required.

In Fig. 3, the spout $h$ is screwed into vessel and has a tap $k$ on its off or right side; it is also made in two parts being joined by a screw connection at $l$. It is also screwed at tip to permit of a nozzle $m$—"rose or spout"—being screwed into or on to it. The usual tap used in milk cans is shown attached to vessel in Fig. 1.

What I claim as my invention and what I desire to secure by Letters Patent is:—

1. The combination in a vessel for storing fluid under air pressure, of a chamber for containing the liquid having at its upper end an out turned slotted flange, of a cap or cover for said vessel having a prolonged cylindrical portion to fit within the liquid chamber adjacent to the walls thereof to constitute an air compressing chamber, and provided at its upper end with an outwardly and downwardly extending flange, having an inwardly turned lip to enter the slotted portion of the flange to the liquid chamber and to pass under said flange whereby it may be held in place against the air pressure within the vessel, substantially as and for the purposes described.

2. The combination in a vessel for storing fluid under air pressure, of a liquid holding chamber having an inner and an outer wall to form a space between the two, of a cap or cover for said chamber having a prolonged cylindrical portion working in the space between the two walls of the lower chamber and constituting an air compressing piston, and a catch for holding the cylindrical cap or cover to the lower chamber against the air pressure therein, substantially as and for the purposes described.

EDWARD LENNON CANTWELL.

Witnesses:
WILLIAM SWINHOE,
   *Solicitor, Calcutta.*
E. PERCY SWINHOE,
   *Art. Clerk to Messrs. W. Swinhoe.*